(12) United States Patent
Wang et al.

(10) Patent No.: US 12,189,121 B2
(45) Date of Patent: Jan. 7, 2025

(54) ULTRAFAST ILLUMINATION FOR STRUCTURED LIGHT BASED EYE TRACKING

(71) Applicant: Meta Platforms Technologies, LLC, Menlo Park, CA (US)

(72) Inventors: Youmin Wang, Bellevue, WA (US); Yatong An, Redmond, WA (US); Gaetano Aiello, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 200 days.

(21) Appl. No.: 18/087,305

(22) Filed: Dec. 22, 2022

(65) Prior Publication Data
US 2024/0210677 A1 Jun. 27, 2024

(51) Int. Cl.
*G02B 27/00* (2006.01)
*G02B 26/08* (2006.01)
*G06F 3/01* (2006.01)
*G02B 27/01* (2006.01)

(52) U.S. Cl.
CPC ..... *G02B 27/0093* (2013.01); *G02B 26/0858* (2013.01); *G06F 3/013* (2013.01); *G02B 27/0172* (2013.01); *G02B 2027/0178* (2013.01); *G02B 2027/0187* (2013.01)

(58) Field of Classification Search
CPC ............ G02B 27/0093; G02B 26/0858; G02B 27/0172; G02B 2027/0178; G02B 2027/0187; G06F 3/013
See application file for complete search history.

(56) References Cited

U.S. PATENT DOCUMENTS

| | | |
|---|---|---|
| 7,168,807 B2 | 1/2007 | Chernyak et al. |
| 9,690,092 B2 | 6/2017 | Freedman et al. |
| 10,394,034 B2 | 8/2019 | Reshidko et al. |

(Continued)

FOREIGN PATENT DOCUMENTS

JP 6634967 B2 1/2020

OTHER PUBLICATIONS

Druml N., et al., "1D Mems Micro-Scanning LiDAR," Conference on Sensor Device Technologies and Applications (SENSORDEVICES), Sep. 13, 2018, vol. 9, 6 pages.

(Continued)

*Primary Examiner* — Dmitriy Bolotin
(74) *Attorney, Agent, or Firm* — Mannava & Kang, P.C.

(57) ABSTRACT

An illumination system for eye tracking is described herein. The illumination system may include a laser light source and an ultra-fast scanning micro-electromechanical system (MEMS) operating at a frequency range from about 10 kHz to about 100 kHz to reflect laser light to the eye and generating a desired fringe pattern controlling intensity and timing. A surface of the MEMS may include diffractive optical element (DOE) to reflect the laser light as a concentrated optical beam. The light may also be projected by grating-based illuminators on a photonic integrated circuit (PIC) controlled through adiabatic couplers projecting multiple binary/grayscale images onto the eye. On the detection side, a 2D single-photon avalanche diode (SPAD) sensor or a SPAD array detector and an active MEMS shutter array may be used. Compressive sensing techniques may be applied on the detection side.

20 Claims, 13 Drawing Sheets

(56) References Cited

U.S. PATENT DOCUMENTS

| | | | |
|---|---|---|---|
| 10,423,222 B2* | 9/2019 | Popovich | G02F 1/2955 |
| 10,466,779 B1* | 11/2019 | Liu | G02B 27/0093 |
| 10,732,709 B1* | 8/2020 | Chao | G02B 27/017 |
| 10,976,811 B2 | 4/2021 | Cirucci et al. | |
| 11,120,258 B1 | 9/2021 | Fix et al. | |
| 11,307,409 B2 | 4/2022 | Aleem | |
| 2017/0316487 A1* | 11/2017 | Mazed | G06Q 30/0241 |
| 2021/0006763 A1* | 1/2021 | Heshmat Dehkordi | H04N 13/307 |
| 2022/0003676 A1* | 1/2022 | Mazed | G01N 21/658 |
| 2022/0011567 A1 | 1/2022 | Carminati et al. | |
| 2022/0091235 A1 | 3/2022 | Lu et al. | |
| 2022/0174255 A1 | 6/2022 | Price et al. | |
| 2023/0210442 A1* | 7/2023 | Krueger | A61B 5/6803 600/301 |
| 2023/0280468 A1* | 9/2023 | Zhu | G01S 7/4816 356/5.01 |
| 2023/0316657 A1* | 10/2023 | Smits | G01B 11/2513 345/629 |
| 2023/0418083 A1* | 12/2023 | Zhu | G02B 27/286 |
| 2024/0027752 A1* | 1/2024 | Zahirovic | G06T 7/74 |
| 2024/0061500 A1* | 2/2024 | An | G01B 11/254 |
| 2024/0094809 A1* | 3/2024 | Zhang | G06V 10/145 |
| 2024/0126084 A1* | 4/2024 | Wang | G06T 19/006 |
| 2024/0126367 A1* | 4/2024 | Aiello | G06F 3/011 |
| 2024/0130621 A1* | 4/2024 | Islam | A61B 5/0022 |
| 2024/0160023 A1* | 5/2024 | Park | G02B 27/0172 |
| 2024/0192493 A1* | 6/2024 | An | G06F 1/163 |
| 2024/0213746 A1* | 6/2024 | An | G02B 27/017 |

OTHER PUBLICATIONS

Goldman D.A., et al., "MOEMS-based Lens-Assisted Beam Steering for Free-Space Optical Communications," TechRxiv, Jun. 14, 2022, 17 pages.

Seok T.J., et al., "Large-Scale Broadband Digital Silicon Photonic Switches with Vertical Adiabatic Couplers," Optica, Jan. 2016, vol. 3, No. 1, pp. 64-70.

* cited by examiner

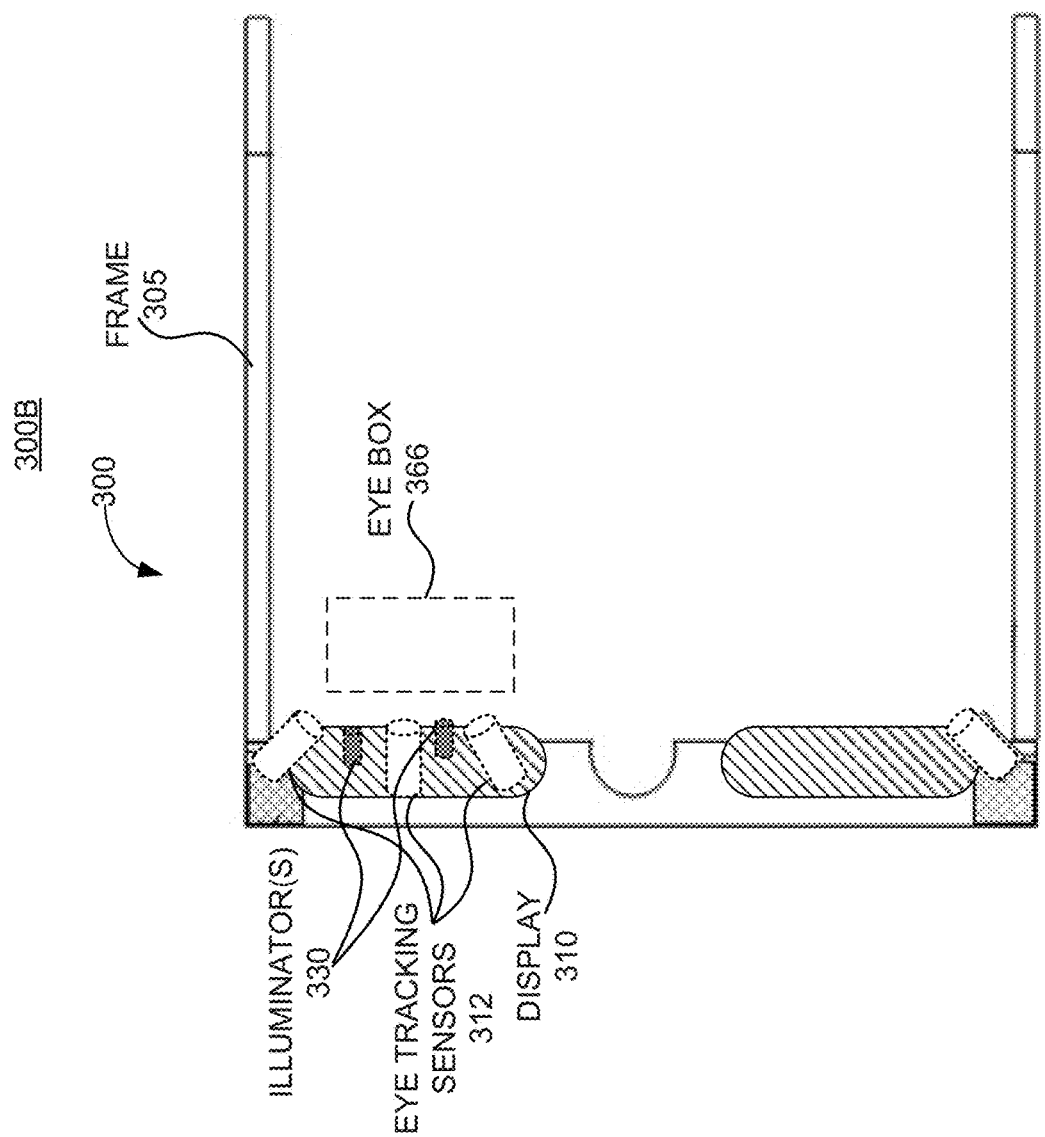

ULTRAFAST ILLUMINATION FOR STRUCTURED LIGHT BASED EYE TRACKING

TECHNICAL FIELD

This patent application relates generally to eye tracking in near-eye display devices, and in particular, ultrafast illumination for structured light based eye tracking with compressive sensing or single photon avalanche diode (SPAD) sensing.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment. Head-mounted display (HMD) devices may also present interactive content, where a user's (wearer's) gaze may be used as input for the interactive content.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIGS. 3A and 3B illustrate a perspective view and a top view of a near-eye display in the form of a pair of glasses, according to an example.

DETAILED DESCRIPTION

Figure 1:
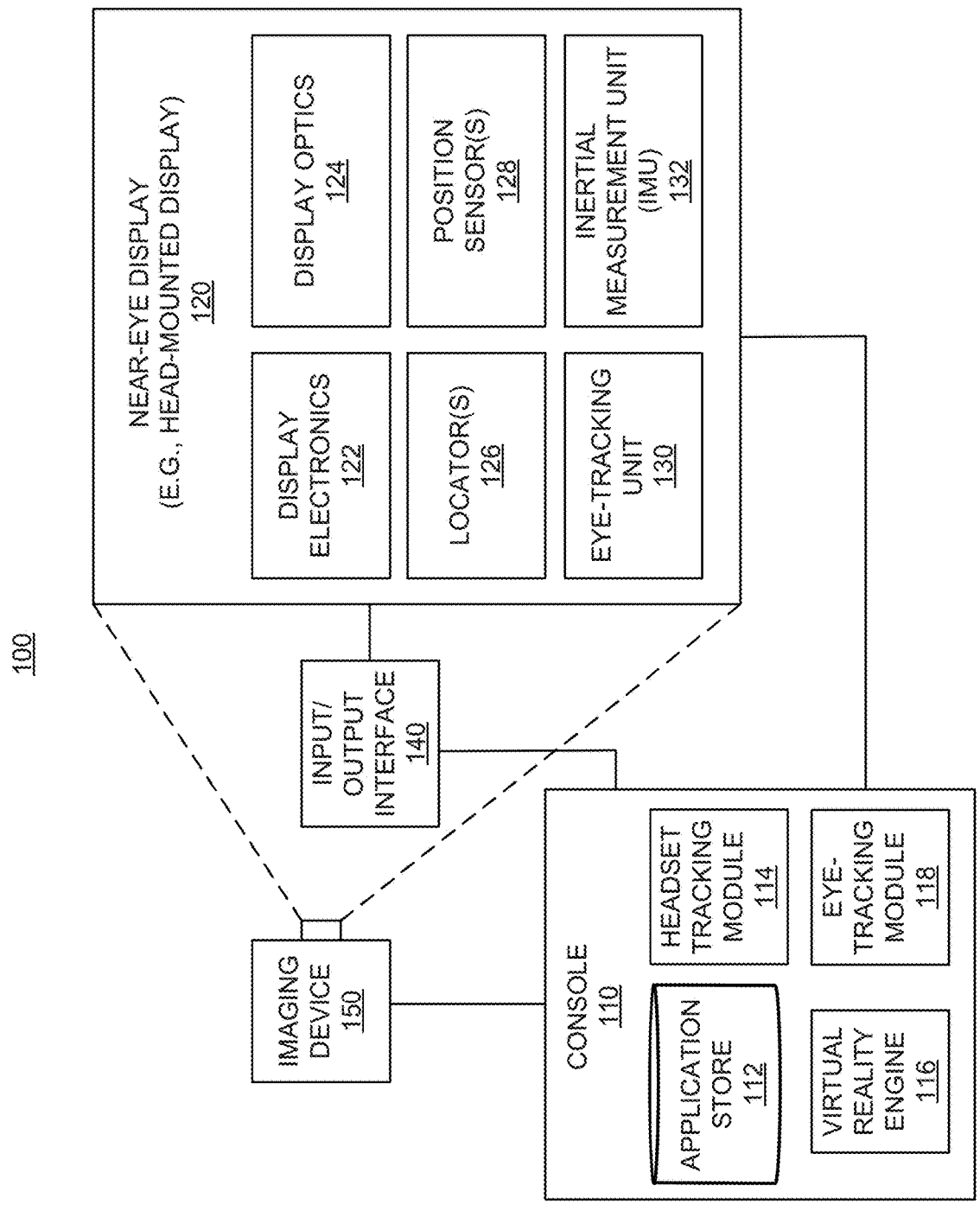
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Tracking a position and orientation of the eye as well as gaze direction in head-mounted display (HMD) devices may unlock display and rendering architectures that can substantially alleviate the power and computational requirements to render 3D environments. Furthermore, eye-tracking enabled gaze prediction and intent inference can enable intuitive and immersive user experiences adaptive to the user requirements in his/her interaction with the virtual environment.

Eye tracking may be achieved via a number of techniques. Fringe projection, which projects a periodical pattern onto the eye and uses the reflected pattern to determine three-dimensional (3D) features, is one technique. Another technique utilizes time-of-flight analysis of light projected onto the eye. These and similar techniques involve projection of light, for example, laser light onto the eye and capture of the reflection from the eye at a near distance.

Eye motion can achieve up to 1000 degrees per second. Thus, high speed measurement is critical for eye tracking applications. Thus, to achieve ultra-high speed eye tracking beyond 1000 frame per second using structured light sensing, both fast illumination and fast detection may be needed. For augmented reality (AR)/virtual reality (VR) eye tracking applications, strict size and power requirements limit the use of traditional illumination apparatus such as digital light processing (DLP) and liquid crystal technology on silicon (LCOS) based projectors. Such high image capture speeds are also difficult to achieve with cameras (unless specialty cameras are used). Specifically, small form factor cameras used in near-eye display devices may be incapable of achieving such capture rates. Single photon avalanche diode (SPAD) sensors are small form factor sensors that can achieve ultra-fast speeds. However, single photon avalanche diode (SPAD) sensors have their own challenges in eye tracking applications, such as limited bandwidth, noise susceptibility to name a few.

In some examples of the present disclosure, an illumination system for eye tracking may include a laser light source and an ultra-fast scanning micro-electromechanical system (MEMS). The micro-electromechanical system (MEMS) may operate at a frequency range from about 10 kHz to about 100 kHz to reflect the incoming laser light towards the far field. The system may also control laser light intensity and timing to generate a desired fringe pattern. A surface of the micro-electromechanical system (MEMS) may include, in some examples, a diffractive optical element (DOE) to reflect the incoming laser light as a concentrated optical beam. On the detection side, a 2D single-photon avalanche diode (SPAD) sensor, a single-photon avalanche diode (SPAD) array detector and an active micro-electromechanical system (MEMS) shutter array may be used. In other examples, light may be projected by grating-based illuminators being coupled to the illuminators through adiabatic couplers. An active micro-electromechanical (MEMS) adiabatic switch may select the waveguide emitters for emitting the illumination beam to the eye. The micro-electromechanical system (MEMS) adiabatic switch illuminator may also project multiple binary/grayscale images onto the retina (illumination pattern) and utilize single pixels to capture the reflected signals received from the retina. Compressive sensing techniques may be applied on the detection side.

While some advantages and benefits of the present disclosure are apparent, other advantages and benefits may include reduction of computational resources and increased speed of eye tracking without added complexity of high-speed cameras to the eye tracking system. Furthermore, an accuracy and/or power consumption efficiency of the eye tracking system may also be increased.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a head-mounted display (HMD), a pair of glasses, or other similar wearable eyewear or device. Examples of the near-eye display 120 are further described below with respect to FIGS. 2 and 3. Additionally, in some examples, the functionality described herein may be used in a head-mounted display (HMD) or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye tracking unit 130. In some examples, the near-eye display 120 may also include one or more locators 126, one or more position sensors 128, and an inertial measurement unit (IMU) 132. In some examples, the near-eye display 120 may omit any of the eye tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display 120 may include a projector (not shown), which may form an image in angular domain for direct observation by a viewer's eye through a pupil. The projector may employ a controllable light source (e.g., a laser source) and a micro-electromechanical system (MEMS) beam scanner to create a light field from, for example, a collimated light beam. In some examples, the same projector or a different projector may be used to project a fringe pattern on the eye, which may be captured by a camera and analyzed (e.g., by the eye tracking unit 130) to determine a position of the eye (the pupil), a gaze, etc.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye tracking unit 130 may include one or more eye tracking systems. As used herein, "eye tracking" may refer to determining an eye's position or relative position, including orientation, location, and/or gaze of a user's eye. In some examples, an eye tracking system may include an imaging system that captures one or more images of an eye and may optionally include a light emitter, which may generate light (e.g., a fringe pattern) that is directed to an eye such that light reflected by the eye may be captured by the imaging system (e.g., a camera). In other examples, the eye tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye tracking module 118. Based on the received information, the virtual reality engine 116 may determine content to provide to the near-eye display 120 for presentation to the user.

In some examples, the eye tracking module 118, which may be implemented as a processor or controller, may receive eye tracking data from the eye tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
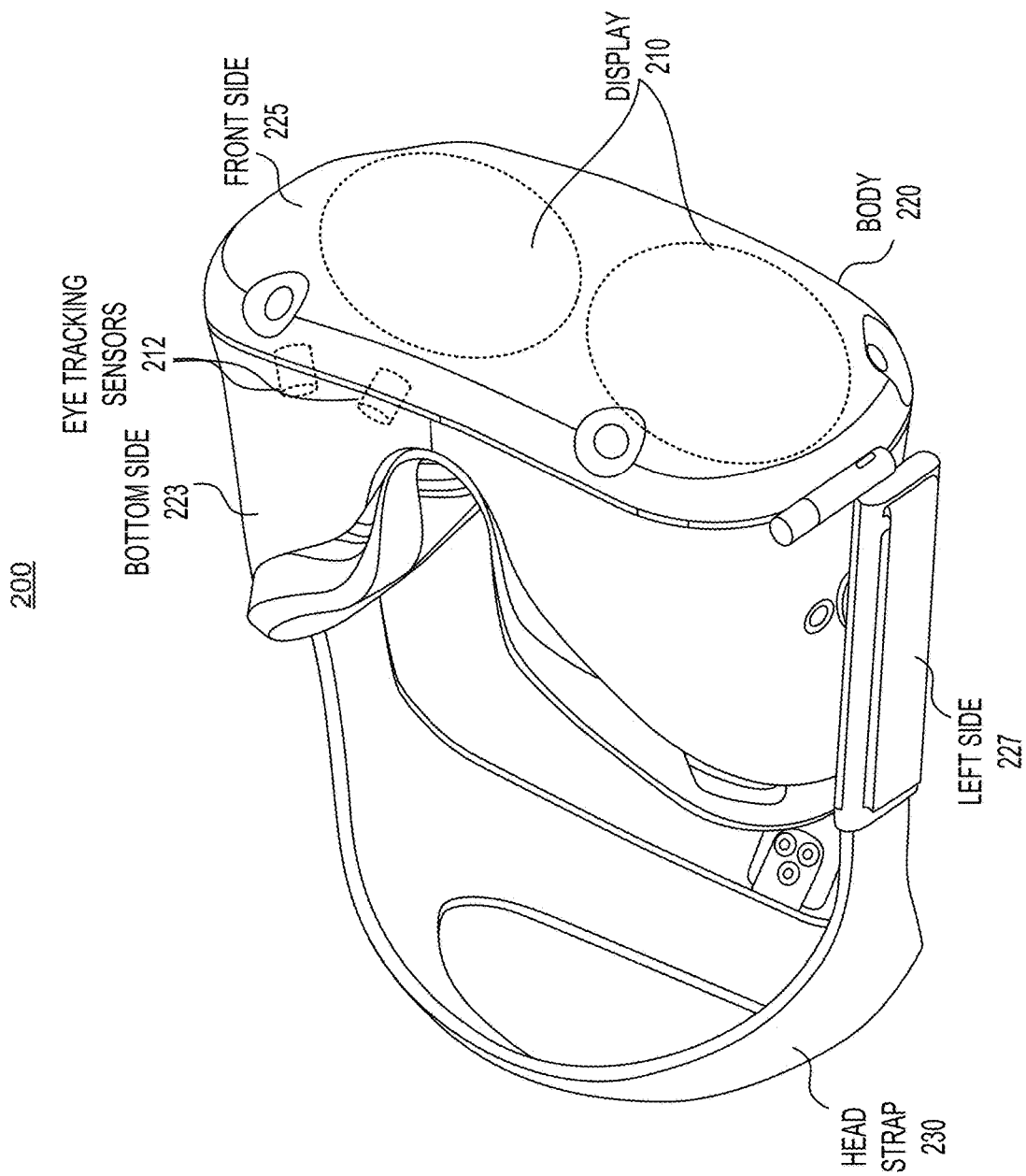
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the head-mounted device (HMD) device 200 may be a part of a virtual reality (VR) system, an augmented reality (AR) system, a mixed reality (MR) system, another system that uses displays or wearables, or any combination thereof. In some examples, the head-mounted display (HMD) device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components.

In some examples, the head-mounted display (HMD) device 200 may present, to a user, media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the head-mounted display (HMD) device 200.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface 140 for communicating with a console 110, as described with respect to FIG. 1. In some examples, the head-mounted display (HMD) device 200 may include a virtual reality engine (not shown), but similar to the virtual reality engine 116 described with respect to FIG. 1, that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine 116 may be used for producing a signal (e.g., display instructions) to the one or more display assemblies. In some examples, the head-mounted display (HMD) device 200 may include locators (not shown), but similar to the locators 126 described in FIG. 1, which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

In some examples, the projector may provide a structured light (fringe pattern) onto the eye which may be captured by the eye tracking sensors 212. The eye tracking sensors 212 or a communicatively coupled processor/controller (e.g., eye tracking module 118 in FIG. 1) may analyze the captured reflection of the fringe pattern and analyze to generate a phase map of the fringe pattern, which may provide depth information for the eye and its structures. In other examples, the projector may include an ultra-fast scanning microelectromechanical system (MEMS) to reflect laser light and create a fringe pattern or a photonic integrated circuit (PIC) to create binary or grayscale patterns. On the detection side, single-photon avalanche diode (SPAD) based sensors and/or compressive sensing techniques may be employed.

Figure 3A:
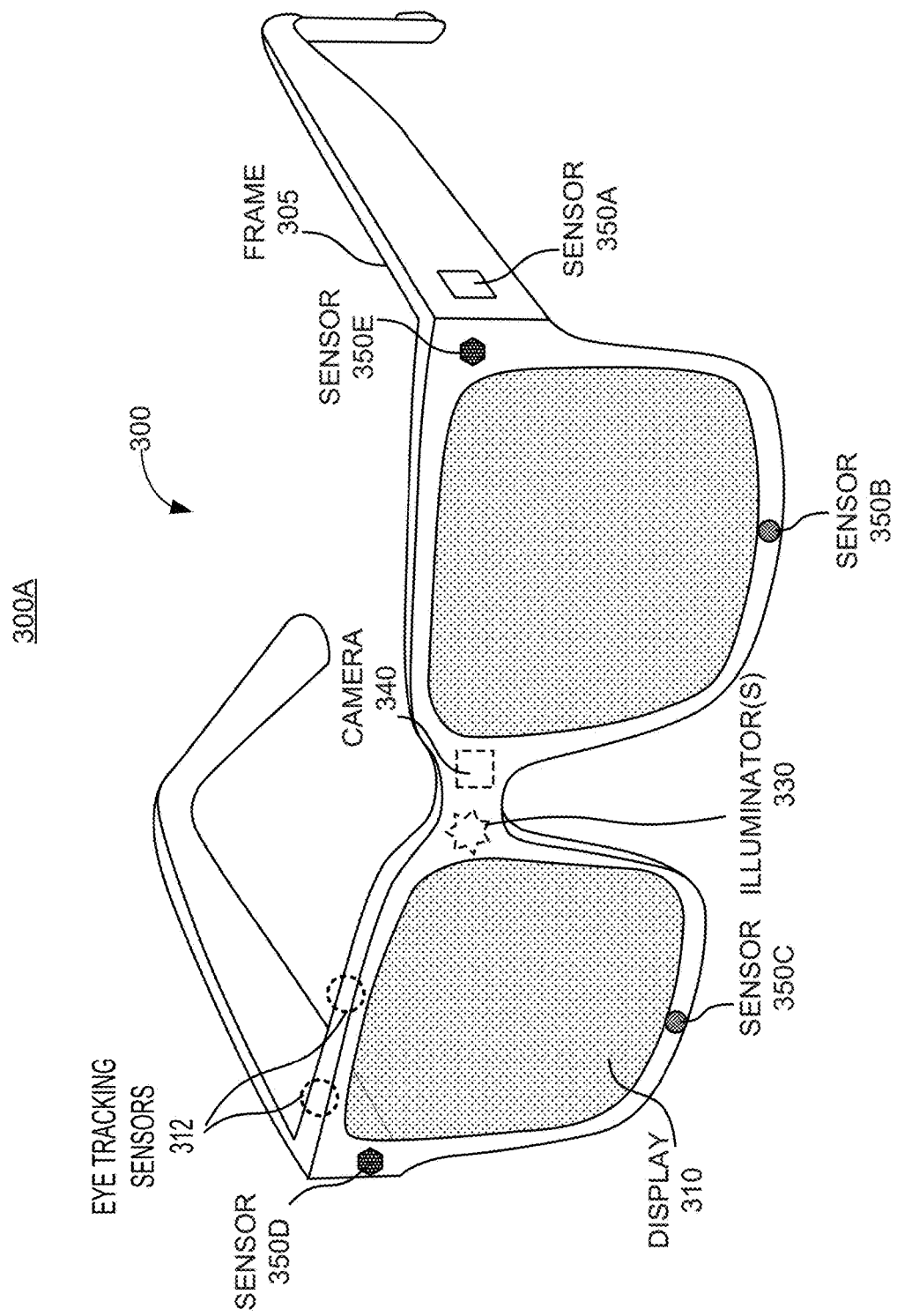

FIG. 3A is a perspective view 300A of a near-eye display 300 in the form of a pair of glasses (or other similar eyewear), according to an example. In some examples, the near-eye display 300 may be a specific example of near-eye display 120 of FIG. 1 and may be configured to operate as a virtual reality display, an augmented reality (AR) display, and/or a mixed reality (MR) display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 210 may include a projector, or in place of the display 310 the near-eye display 300 may include a projector.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications. The near-eye display 300 may also include eye tracking sensors 312.

FIG. 3B is a top view 300B of a near-eye display 300 in the form of a pair of glasses (or other similar eyewear), according to an example. In some examples, the near-eye display 300 may include a frame 305 having a form factor of a pair of eyeglasses. The frame 305 supports, for each eye: a fringe projector 314 such as any fringe projector variant considered herein, a display 310 to present content to an eye box 366, eye tracking sensors 312, and one or more illuminators 330. The illuminators 330 may be used for illuminating an eye box 366, as well as, for providing glint illumination to the eye. A fringe projector 314 may provide a periodic fringe pattern onto a user's eye. The display 310 may include a pupil-replicating waveguide to receive the fan of light beams and provide multiple laterally offset parallel copies of each beam of the fan of light beams, thereby extending a projected image over the eye box 366.

In some examples, the pupil-replicating waveguide may be transparent or translucent to enable the user to view the outside world together with the images projected into each eye and superimposed with the outside world view. The images projected into each eye may include objects disposed with a simulated parallax, so as to appear immersed into the real-world view.

The eye tracking sensors 312 may be used to determine position and/or orientation of both eyes of the user. Once the position and orientation of the user's eyes are known, a gaze convergence distance and direction may be determined. In some examples, the eye tracking sensors 312 may be single photon avalanche diode (SPAD) sensors. The imagery displayed by the display 310 may be adjusted dynamically to account for the user's gaze, for a better fidelity of immersion of the user into the displayed augmented reality scenery, and/or to provide specific functions of interaction with the augmented reality. In operation, the illuminators 330 may illuminate the eyes at the corresponding eye boxes 366, to enable the eye tracking cameras to obtain the images of the eyes, as well as to provide reference reflections. The reflections (also referred to as "glints") may function as reference points in the captured eye image, facilitating the eye gazing direction determination by determining position of the eye pupil images relative to the glints. To avoid distracting the user with illuminating light, the latter may be made invisible to the user. For example, infrared light may be used to illuminate the eye boxes 366.

In some examples, the image processing and eye position/orientation determination functions may be performed by a central controller, not shown, of the near-eye display 300. The central controller may also provide control signals to the display 310 to generate the images to be displayed to the user, depending on the determined eye positions, eye orientations, gaze directions, eyes vergence, etc.

Figure 4:
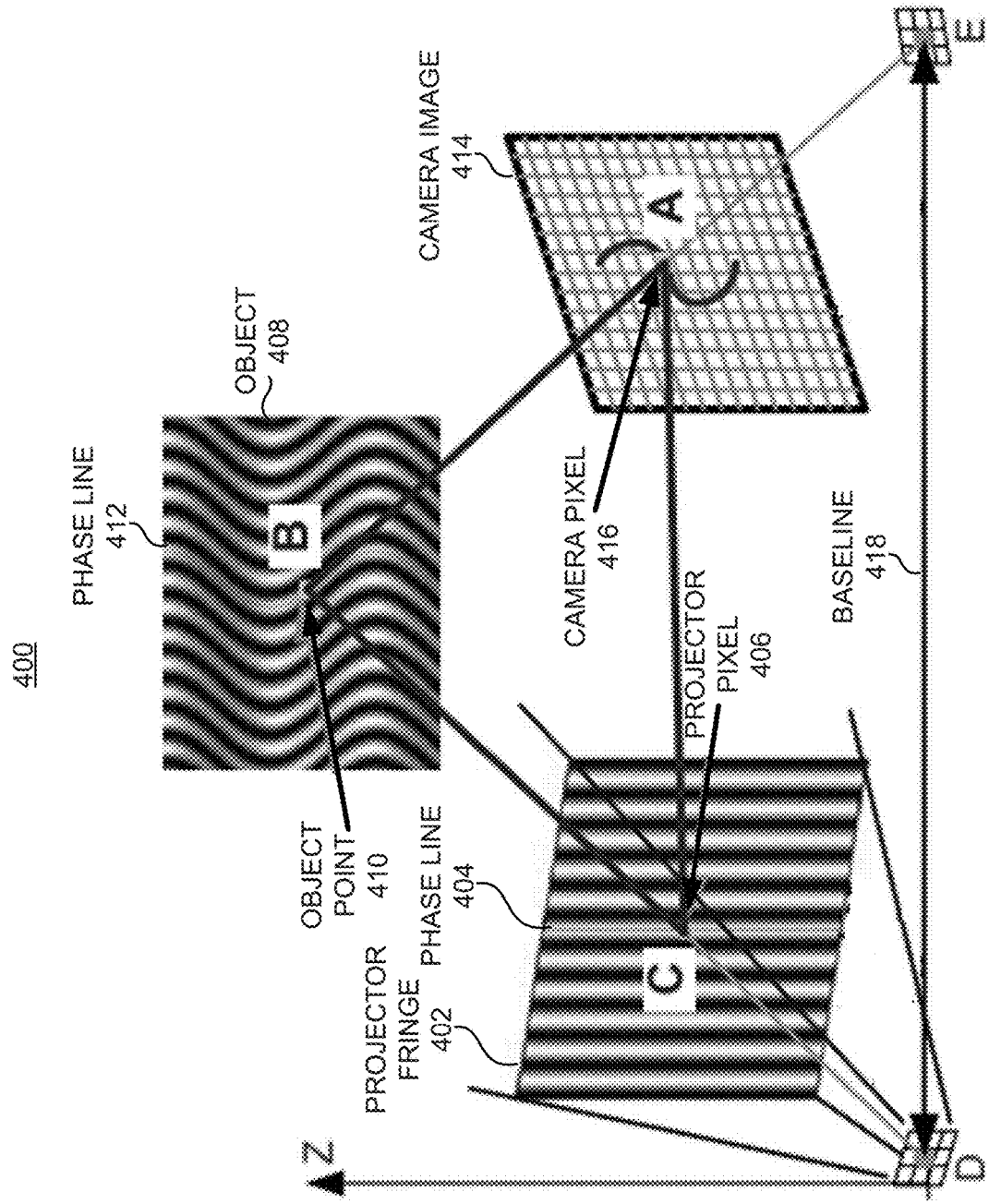
FIG. 4 illustrates a diagram of a structured light based eye tracking system, according to examples.

FIG. 4 illustrates a diagram 400 of a structured light based eye tracking system, according to examples. The diagram 400 shows a light source D projecting a projector fringe 402 (C) with a phase line 404 and a projector pixel 406 onto an object 408 (B) with phase line 412, where the projector pixel 406 is projected as object point 410. The reflected fringe pattern is captured by a camera (sensor) E as camera image 414 (A), where the object point 410 is captured as camera pixel 416.

In some examples, a single-photon avalanche diode (SPAD) sensor (or sensor system as discussed in conjunction with FIG. 9C) may be used for the ultrafast image detection. In lower bit single-photon avalanche diode (SPAD) based imaging (e.g., 1 bit to 3 bits), ultrahigh speeds up to a few 10 s of kilo frames per second may be achieved based on the single-photon avalanche diode (SPAD) photon counting capability. However, due to the relatively low photon detection efficiency (PDE) and environmental noise caused false triggering, averaging may be needed and therefore the effective 3D imaging frame rate may be lower. To match the imaging speed, illumination may need to achieve the same or even higher speeds for programmable pattern illumination.

Single photon avalanche diode (SPAD) sensors may achieve superfast measurement by increasing gain to decrease the integration time. Because of the high gain property, single photon avalanche diode (SPAD) sensors may be affected by the ambient light easily, leading to noise in the measurement. In some examples, narrow band single photon avalanche diode (SPAD) sensors may be used to address noise challenges in the feature matching process and achieve more accurate measurements.

Feature matching refers to finding corresponding features from two similar images based on a search distance algorithm. One of the images may be considered the source and the other as target, and the feature matching technique may be used to either find or derive and transfer attributes from source to target image. The feature matching process may analyze the source and the target image's topology, detect feature patterns, match the patterns, and match the features within the discovered patterns. The accuracy of feature matching may depend on image similarity, complexity, and quality. Thus, reduction of noise due to ambient light in single photon avalanche diode (SPAD) sensors may provide increased accuracy in detection of three-dimensional (3D) features of the eye, specifically, the pupil, which may then be used to determine the user's gaze.

Figure 5:
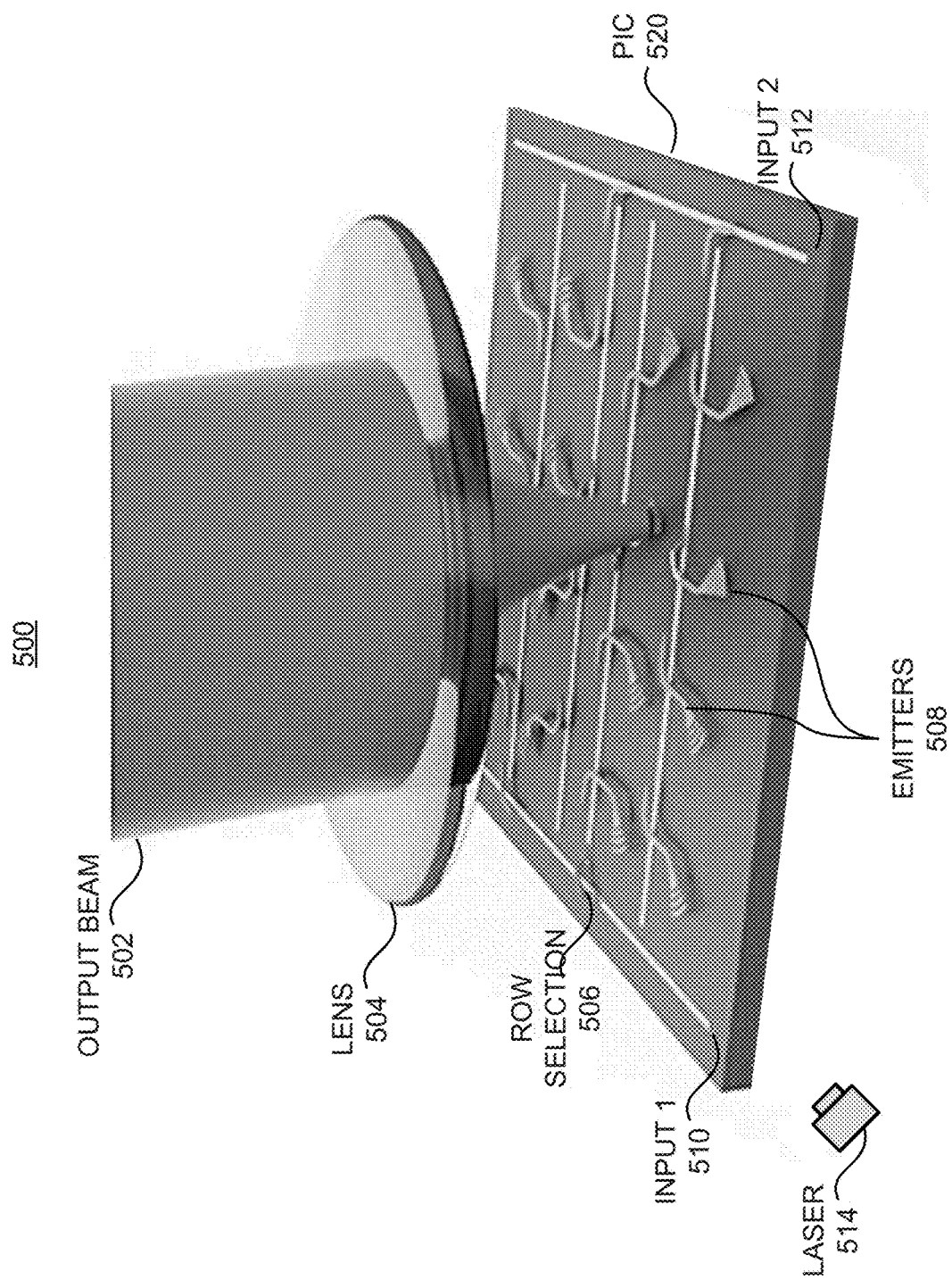
FIG. 5 illustrates a diagram of far field focal plane based structured light projection for eye tracking, according to examples.

FIG. 5 illustrates a diagram 500 of far field focal plane based structured light projection for eye tracking, according to examples. The diagram 500 shows a photonic integrated circuit (PIC) 520 may include a number of emitters 508, which may be grating based illuminators. In some examples, the emitters 508 may be organized in a matrix format in rows and columns between two (or more) input lines 510, 512. A row selection 506 and/or a column selection to provide light from the input lines 510, 512 may be accomplished through adiabatic switches.

In an operation, light from a light source such as an edge emitting laser 514 may be directed through one or more adiabatic switches to one or more emitters and projected out. The projected light may be focused by a lens 504 creating output beam 502. Thus, far field focal plane based projection may be realized by activating different grating based illuminators (waveguide emitters) through active micro-electromechanical system (MEMS) controlled adiabatic switches.

Figure 6:
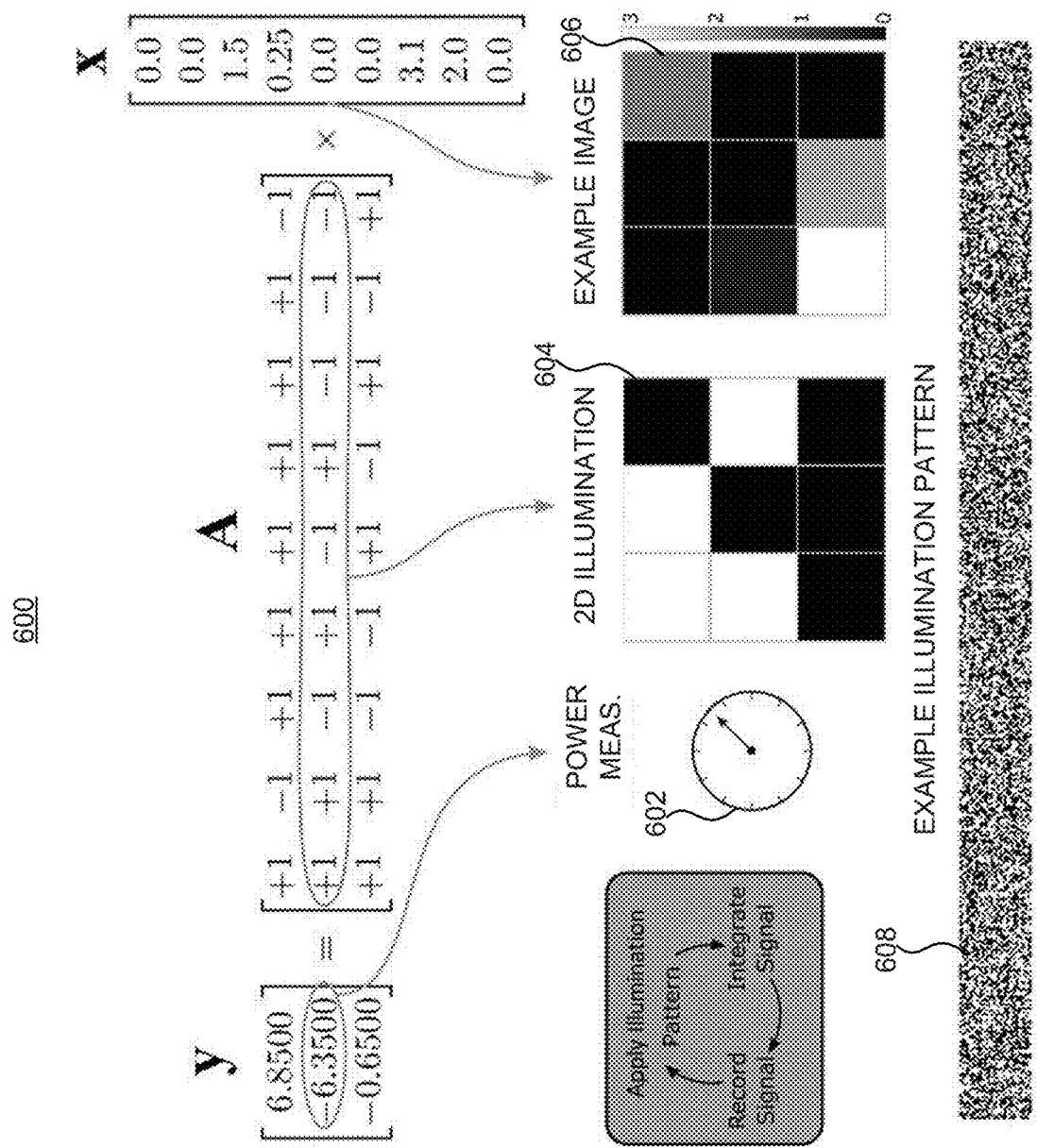
FIG. 6 illustrates a diagram of compressive sensing based resolution enhancement in structured light based eye tracking, according to examples.

FIG. 6 illustrates a diagram 600 of compressive sensing based resolution enhancement in structured light based eye tracking, according to examples. The diagram 600 shows an example compressive sensing technique implementation, where a matrix equation may be formed by multiplying a 2D illumination matrix 604 and an example image vector 606 arriving at power measurement vector 602. Through an iterative process of applying illumination pattern, integrating the signal, and recording the signal, an example illumination pattern 608 may be reconstructed.

Compressive sensing is employed for efficiently acquiring and reconstructing an image (or other signals), by finding solutions to underdetermined linear systems based on the principle that, through optimization, a sparsity of a signal may be exploited to recover the signal from fewer samples than required by the Nyquist-Shannon sampling theorem. For reconstruction using compressive sensing, sparsity and incoherence are required conditions, which both exist in fringe pattern projection and capture systems. Compressed sensing may begin with a weighted linear combination of samples in a domain different from the domain in which the signal is sparse. To convert the image back to the intended domain, an underdetermined matrix equation may be solved because a number of compressive measurements is smaller than a number of pixels in the image. However, with the initial signal being sparse, the matrix equation may be solved as an underdetermined system of linear equations.

In some examples, two or more single pixels and a 2D micro-electromechanical system (MEMS) switch illuminator may be used for 3D reconstruction of the retina surface. The 2D micro-electromechanical system (MEMS) switch illuminator device may project multiple binary images or grayscale images onto the retina. Single pixels may capture the signal. Using compressive sensing techniques, such as Fourier Transform, each pixel may recover a grayscale image of the retina.

Figure 7:
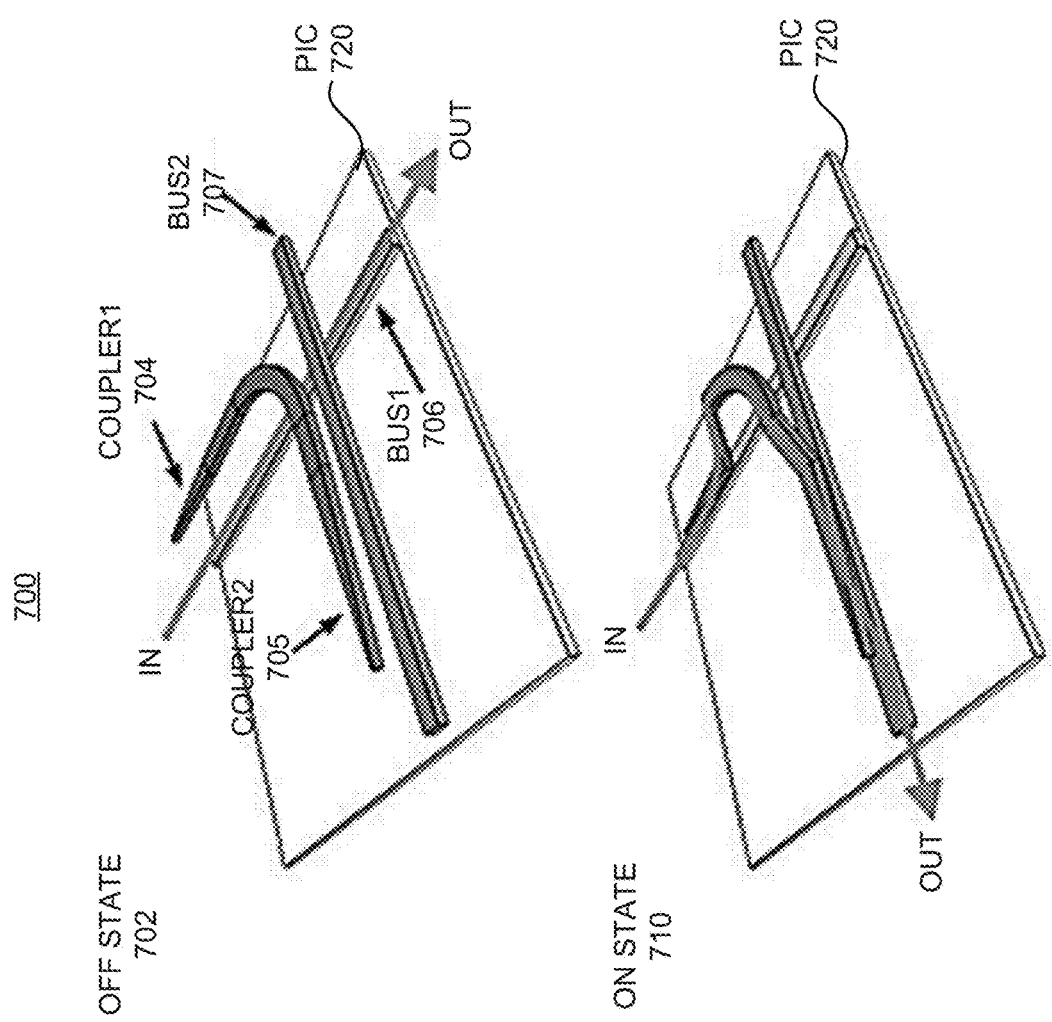
FIG. 7 illustrates a diagram of micro-electromechanical system (MEMS) based switch realization in a far field focal plane based structured light projection system for eye tracking, according to examples.

FIG. 7 illustrates a diagram 700 of micro-electromechanical system (MEMS) based switch realization in a far field focal plane based structured light projection system for eye tracking, according to examples. Diagram 700 shows a coupling portion of a photonic integrated circuit (PIC) 720 in an off state 702 and an on state 710. In the off state 702, the couplers 704, 705 may be positioned sufficiently above the input line (bus 1 706) and bus 2 707 to prevent light from propagating from the input line (bus 1 706) to the bus 2 707 to which one or more diffractive waveguide emitters may be coupled. In the on state 710, the couplers 704, 705 may be physically moved to within an evanescent-coupling distance of both source and diffractive waveguides. As a result, light is directed from the input line (bus 1 706) to the bus 2 707 through the adiabatic couplers.

In some examples, the diffractive waveguide emitters may provide Fraunhofer diffraction. Fraunhofer diffraction is a model of the diffraction of waves when plane waves are incident on a diffracting object, and the diffraction pattern is viewed at a distance satisfying Fraunhofer condition from the object or at the focal plane of an imaging lens (as opposed to Fresnel diffraction).

The diffractive waveguide emitters may include any number and type of diffractive elements on their surface. Thus, the projected fringe pattern may be a linear one (e.g., periodic light and dark lines) or another, more complex, pattern (e.g., any grayscale pattern). Furthermore, by activating multiple diffractive waveguides, various fringe patterns may be projected. A phase of the projected fringe pattern may also be selected by using different diffractive elements on the diffractive waveguides. Thus, a type, a period, and a phase of the projected fringe pattern may be selected and varied depending on which diffractive waveguides are activated. By using fringe patterns with different periods, multiple fringe pattern analysis techniques may be employed providing enhanced accuracy without additional size or power consumption cost.

In some examples, selected diffractive waveguides may be activated through micro-electromechanical systems (MEMS) controlled adiabatic switches. The adiabatic switches may include couplers between the source waveguide (input line) and individual diffractive waveguides (rows), which may be raised or lowered by the micro-electromechanical systems (MEMS) coupling the source waveguide to the selected diffractive waveguides and flowing light to the selected diffractive waveguides. Micro-electromechanical systems (MEMS) are electromechanical devices and structures with scaled down elements manufactured through micromanufacturing techniques. In some examples, electrostatic force may be used to raise and lower the couplers, thereby, reducing power consumption.

In some examples, the diffractive waveguides may be arranged on the photonic integrated circuit (PIC) parallel to each other, and the source waveguide may be perpendicular to the diffractive waveguides on the top surface of the photonic integrated circuit (PIC). The couplers (e.g., couplers 704, 705) may be 90-degree optical couplers between the source waveguide and the diffractive waveguides. The couplers may be raised (uncoupled) in an off state and lowered (coupled) in an on state directing light flow from the source waveguide to selected diffractive waveguides when in the on state.

In some examples, the adiabatic-coupler switching elements at each cross-point may have high coupling efficiencies for both polarizations. Activation of the selected diffractive waveguides may be achieved by physically moving the adiabatic couplers with micro-electromechanical system (MEMS) actuators. As mentioned herein, in an off state, the couplers may be positioned sufficiently above both waveguides (e.g., more than 800 nm) to prevent light from propagating through them. In an on state, the couplers may be physically moved to within the evanescent-coupling distance (e.g., 80 nm) of both source and diffractive waveguides. As a result, light is directed from the source waveguide to the diffractive waveguide through the adiabatic coupler.

The couplers may be formed as rib waveguides with, for example, a 380 nm-thick core portion and 100 nm thick wing portions. A rib waveguide is a waveguide in which a guiding layer includes a slab with one or more strips superimposed onto the slab. In some examples, the wing portions may be tapered from 150 nm to 850 nm with both tapers being uniform over 90 µm lengths, for example. For low power consumption, the movement of the wing portions may be actuated by electrostatic force with the off state being the default state. Thus, only a small amount of power may be consumed to provide electrostatic force (e.g., charging) at activation time. In other examples, magnetic force may also be used instead of electrostatic force. The described configuration may achieve higher than 30 kHz switching speeds allowing multiple fringe patterns with different periods to be generated sequentially (and rapidly). Thus, multiple fringe analysis techniques may be employed for enhanced accuracy of the eye tracking.

Figure 8:
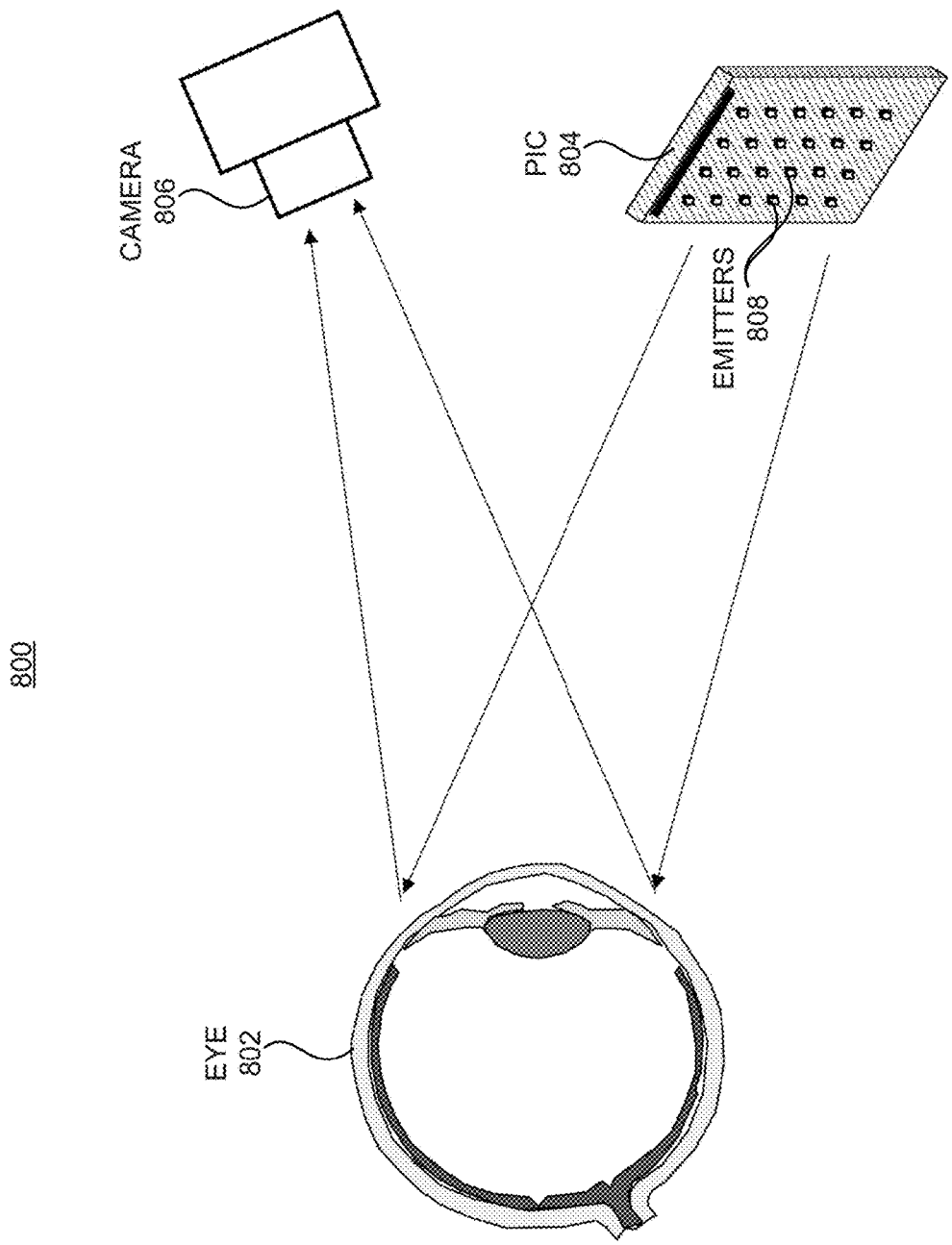
FIG. 8 illustrates a diagram of far field focal plane based structured light projection using a photonic integrated circuit (PIC) for eye tracking, according to examples.

FIG. 8 illustrates a diagram 800 of far field focal plane based structured light projection using a photonic integrated circuit (PIC) for eye tracking, according to examples. The diagram 800 shows a fringe pattern being projected by selected diffractive waveguide emitters 808 on a photonic integrated circuit (PIC) 804 onto an eye 802 and reflected fringe pattern being captured at a camera 806.

As mentioned herein, a micro-electromechanical system (MEMS) adiabatic switch illuminator based source may project multiple binary/grayscale images onto the eye 802, and single pixels may be utilized to capture the reflected signals received from the retina at camera 806. Compressive sensing techniques may be applied on the detection side. Through the use of micro-electromechanical system (MEMS) adiabatic switches, an optically efficient illumination system with a coupling loss of less than 2 dB, fast switching speed higher than 30 kHz, and low power consumption (e.g., electrostatic driven) may be achieved. The projection may be accomplished without power loss similar to display type projectors such as DMD or LCD and enable compressive sensing based enhanced resolution sensing. Fringe patterns may be generated with different periods. Therefore, multiple fringe analysis methods may be adopted based such as Fourier Transform based methods, phase shifting algorithms, etc. Upon retrieval of 3D geometry information of the eye surface, gaze and pupil localization may be obtained.

Figure 9A:
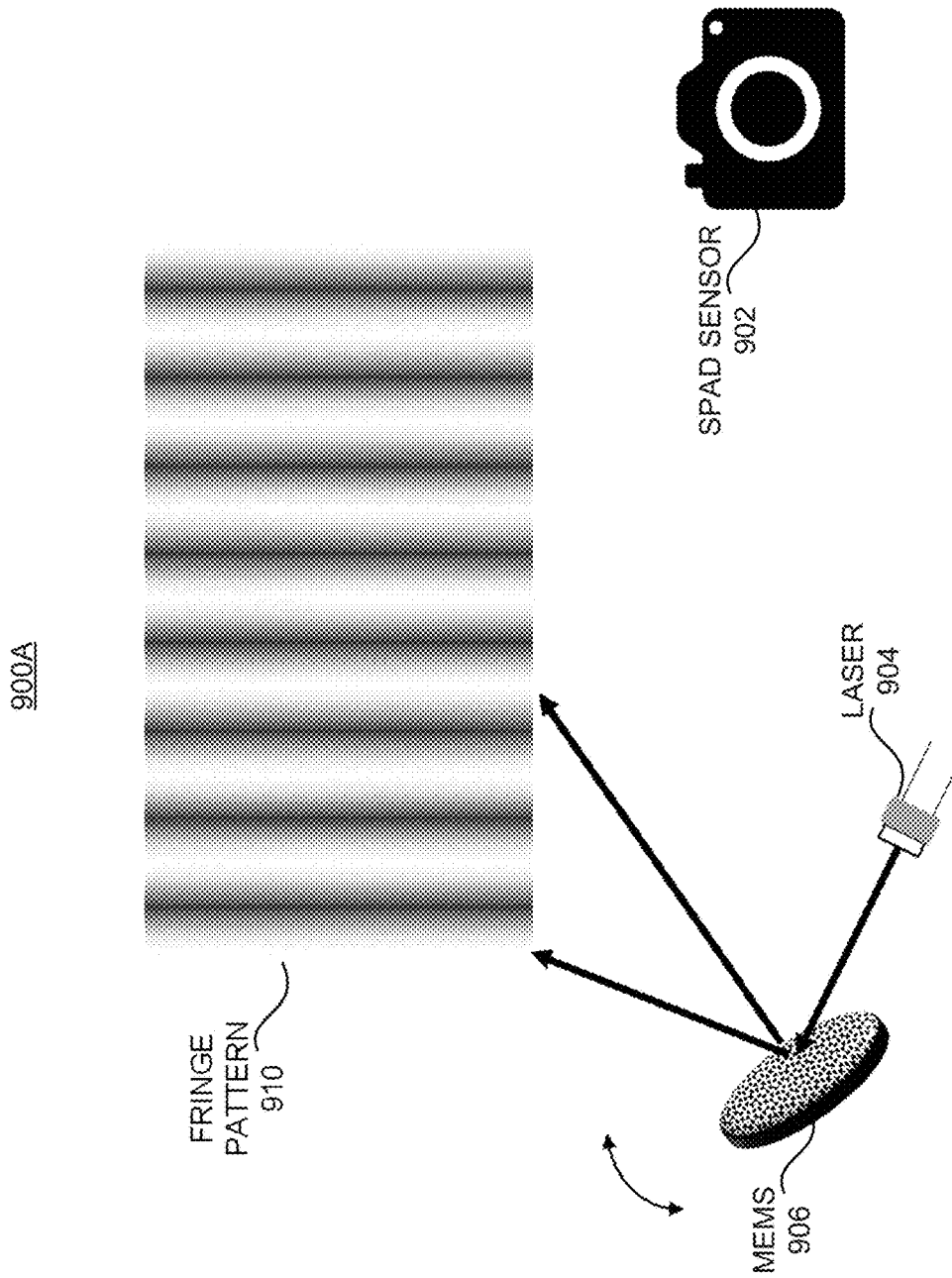
FIGS. 9A-9C illustrate diagrams of ultrafast scanning micro-electromechanical system (MEMS) based structured light systems for eye tracking, according to examples.
Figure 9B:
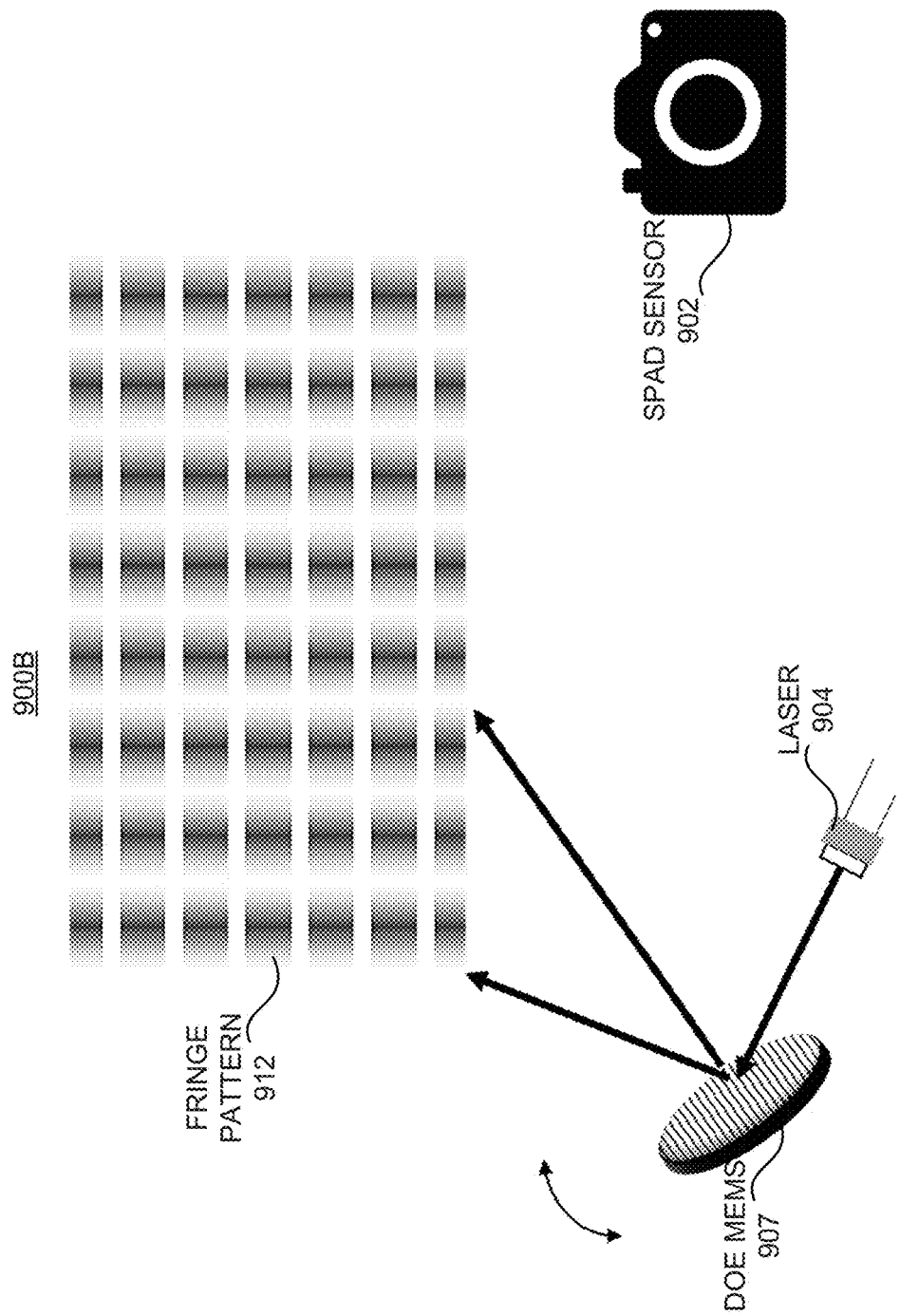
Figure 9C:
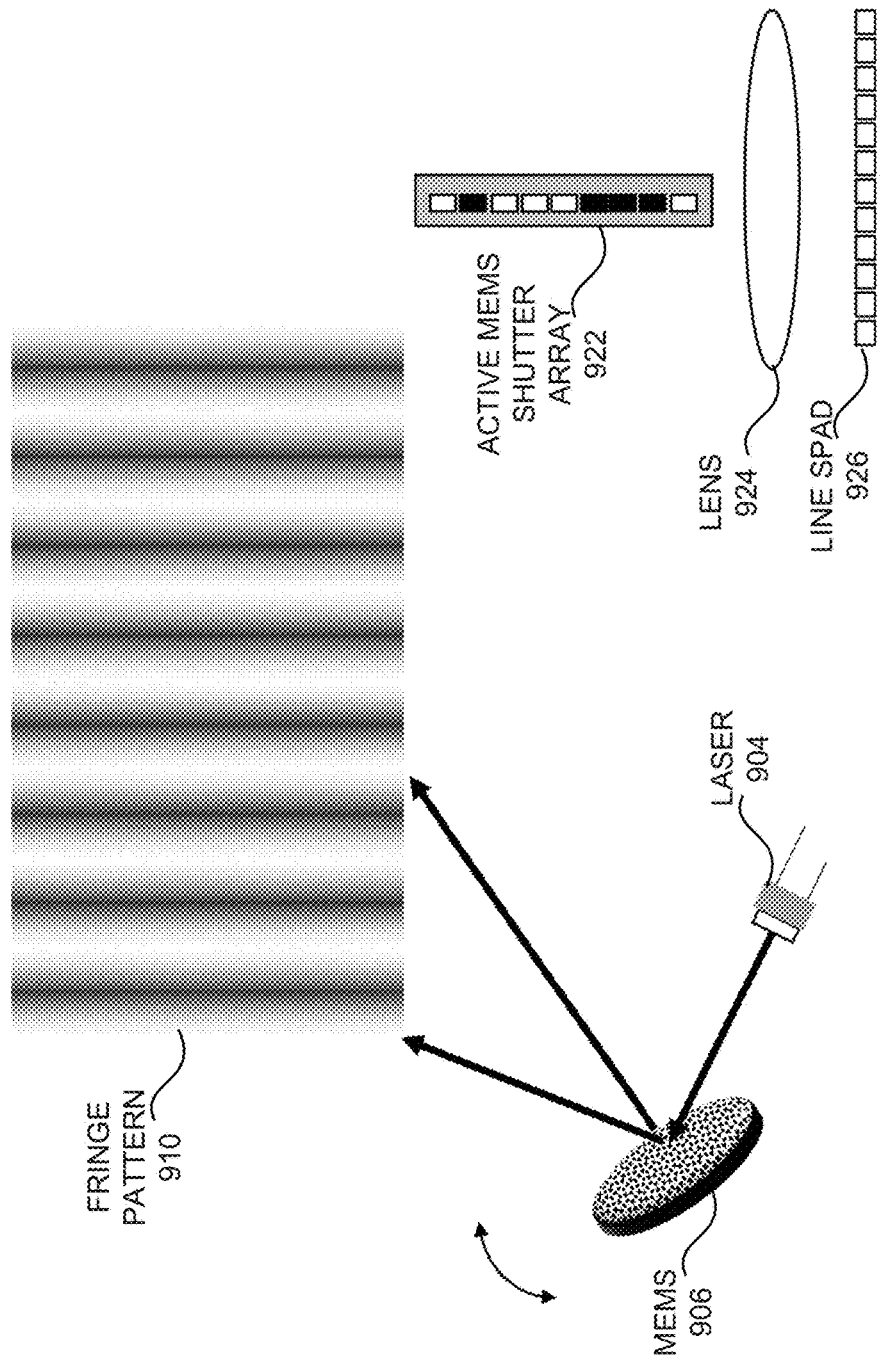

FIGS. 9A-9C illustrate diagrams of ultrafast scanning micro-electromechanical system (MEMS) based structured light systems for eye tracking, according to examples. Diagram 900A in FIG. 9A shows light provided by a collimated light source such as laser 904 being projected as a fringe pattern 910 (through scanning) through micro-electromechanical system (MEMS) reflector 906. A reflection of the fringe pattern from an eye surface may be captured by a single-photon avalanche diode (SPAD) 902. Thus, using an ultra-fast scanning micro-electromechanical system (MEMS) operating at 10 kHz to 100 kHz, the laser light reflected from the micro-electromechanical system (MEMS) surface may be directed toward the far field, and by controlling the laser intensity and timing a desired fringe pattern may be generated.

Diagram 900B in FIG. 9B shows light provided by the laser 904 being projected as fringe pattern 912 through a diffractive optical element (DOE) or metasurface micro-electromechanical system (MEMS) reflector 907. The reflection of the fringe pattern from the eye surface may be captured by the single-photon avalanche diode (SPAD) 902. The configuration in diagram 900B differs from the configuration in diagram 900A, where instead of generating vertical lines, two dimensional patterns may be generated through diffractive optical element (DOE) or metasurfaces on the surface of the micro-electromechanical system (MEMS) 907. This approach may be effective when only a limited number of vertical resolutions are needed for eye tracking. Concentrated optical beam in certain directions may also help enhance signal-to-noise ratio.

Diagram 900C in FIG. 9C shows light provided by the laser 904 being projected as fringe pattern 910 through the micro-electromechanical system (MEMS) reflector 906. The reflection of the fringe pattern from the eye surface may be captured by the single-photon avalanche diode (SPAD) based system comprising an active micro-electromechanical system (MEMS) shutter array 922, a lens 924, and a single-photon avalanche diode (SPAD) array 926.

In some examples, limited number of single-photon avalanche diode (SPAD) pixels may be used to achieve even faster speeds. To guarantee sufficient number of pixels in one direction for the single-photon avalanche diode (SPAD) sensor, a one-dimensional single-photon avalanche diode (SPAD) array 926 may be used instead of a two-dimensional single-photon avalanche diode (SPAD) array, together with an active micro-electromechanical system (MEMS) shutter array 922, for fast 2D imaging. Even in horizontal position, the active micro-electromechanical system (MEMS) shutter array 922 may be turned on with a sequence of patterns, e.g., Hadamard pattern with compressive sensing considerations. With N detections and different shutter array patterns on a single single-photon avalanche diode (SPAD) pixel, the line image may be achieved in the vertical direction.

Figure 10:
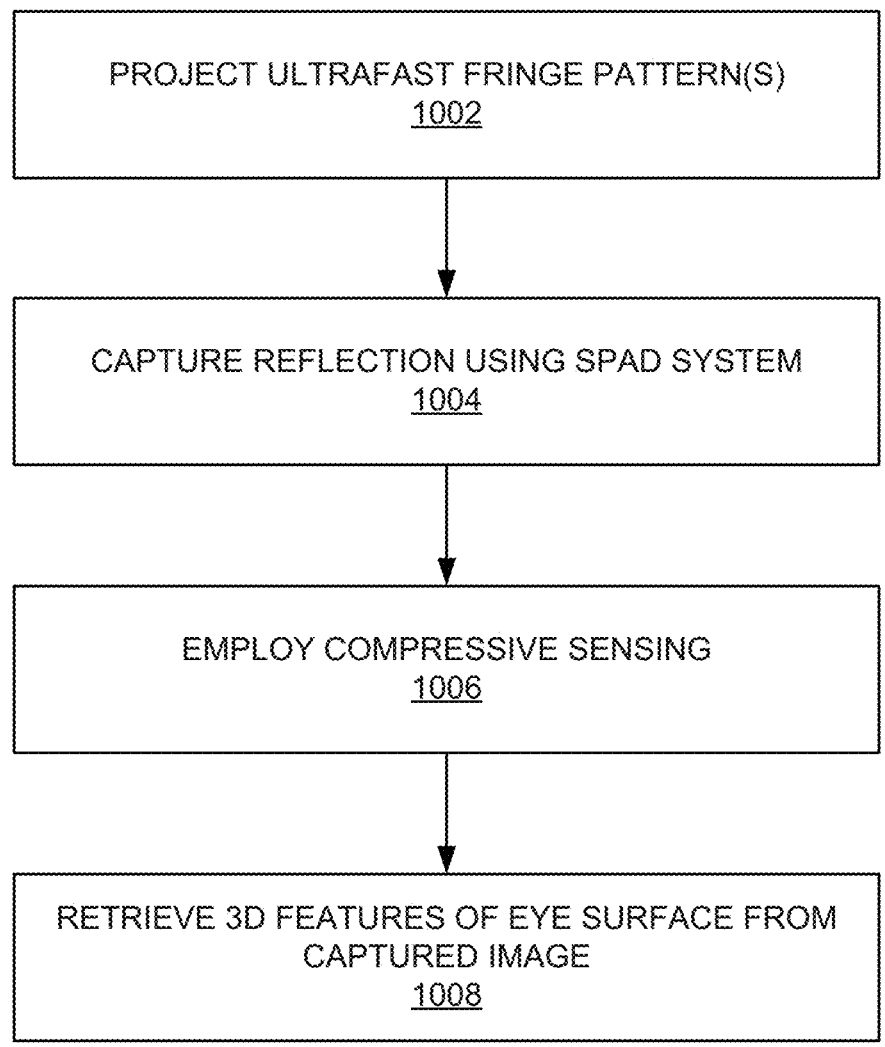
FIG. 10 illustrates a flow diagram of a method for ultrafast scanning structured light based eye tracking systems, according to some examples.

FIG. 10 illustrates a flow diagram of a method 1000 for ultrafast scanning structured light based eye tracking systems, according to some examples. The method 1000 is provided by way of example, as there may be a variety of ways to carry out the method described herein. Although the method 1000 is primarily described as being performed by the components of FIGS. 4-9C, the method 1000 may be executed or otherwise performed by one or more processing components of another system or a combination of systems. Each block shown in FIG. 10 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 1002, a laser light source and an ultra-fast scanning micro-electromechanical system (MEMS) operating at a frequency range from about 10 kHz to about 100 kHz may be used to reflect the laser light towards the eye. The system may control laser light intensity and timing to generate a desired fringe pattern. A surface of the micro-electromechanical system (MEMS) may include, in some examples, a diffractive optical element (DOE) to reflect the incoming laser light as a concentrated optical beam. In other examples, light may be projected by grating-based illuminators on a photonic integrated circuit (PIC) being coupled to the illuminators through adiabatic couplers. The micro-electromechanical system (MEMS) adiabatic switch illuminator may also project multiple binary/grayscale images onto the eye.

At block 1004, a 2D single-photon avalanche diode (SPAD) sensor or a combination of a single-photon avalanche diode (SPAD) array detector and an active micro-electromechanical system (MEMS) shutter array may be used to capture the reflected fringe pattern. Single pixels may be used to capture the reflected light received from the eye.

At block 1006, Compressive sensing techniques may be applied on the detection side. Compressive sensing may be employed by a controller of the eye tracking system for efficiently acquiring and reconstructing an image (or other signals), by finding solutions to underdetermined linear systems based on the principle that, through optimization, a sparsity of a signal may be exploited to recover the signal from fewer samples than required by the Nyquist-Shannon sampling theorem.

At block 1008, 3D features of the surface of the eye may be retrieved from the capture image(s). The features may be retrieved through feature matching by finding corresponding features from two similar images based on a search distance algorithm. One of the images may be considered the source and the other as target, and the feature matching technique may be used to either find or derive and transfer attributes from source to target image. The feature matching process may analyze the source and the target image's topology, detect feature patterns, match the patterns, and match the features within the discovered patterns. The user's gaze may then be inferred from the retrieved features.

According to examples, a method of making an ultrafast eye tracking system with micro-electromechanical system (MEMS) and single photon avalanche diode (SPAD) detection is described herein. A system of making the eye tracking system is also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. An eye tracking system, comprising:
a light source to provide a collimated light;
an ultrafast micro-electromechanical system (MEMS) reflector to project a fringe pattern on a surface of an eye by directing the collimated light;
a single-photon avalanche diode (SPAD) based sensor system to capture a reflection of the fringe pattern from the surface of the eye; and
a controller communicatively coupled to the sensor system, the controller to:
obtain three-dimensional (3D) features of the surface of the eye from the captured reflection to determine a gaze of a user based on the obtained 3D features.

2. The eye tracking system of claim 1, wherein the ultrafast MEMS is to operate at a frequency range from 10 kHz to 100 KHz.

3. The eye tracking system of claim 1, wherein the SPAD based sensor system comprises at least one SPAD sensor.

4. The eye tracking system of claim 1, wherein the SPAD based sensor system comprises at least one of an active MEMS shutter array, an optical lens, or a linear SPAD array.

5. The eye tracking system of claim 4, wherein individual shutters of the active MEMS shutter array are turned on according to a sequence of projected patterns.

6. The eye tracking system of claim 1, wherein a surface of the ultrafast MEMS reflector comprises at least one of a diffractive optical element or a metasurface.

7. The eye tracking system of claim 1, wherein the controller is further to employ a compressive sensing technique to process the captured reflection of the fringe pattern.

8. The eye tracking system of claim 1, wherein the light source comprises a side-emitting laser diode, a vertical-cavity surface-emitting laser (VCSEL) diode, a superluminescent light-emitting diode (SLED), or a light-emitting diode (LED).

9. An eye tracking system, comprising:
a light source to provide collimated light;

a plurality of diffractive waveguide emitters on a photonic integrated circuit (PIC);
a plurality of micro-electromechanical system (MEMS) adiabatic switches to direct the collimated light to individual diffractive waveguide emitters, wherein
the plurality of diffractive waveguide emitters are organized in rows and columns on the PIC, and
selected diffractive waveguide emitters are activated to project a pattern onto a surface of an eye;
a sensor system to capture a reflection of the projected pattern from the surface of the eye; and
a controller communicatively coupled to the sensor system and the PIC, the controller to:
obtain three-dimensional (3D) features of the surface of the eye from the captured reflection to determine a gaze of a user based on the obtained 3D features.

10. The eye tracking system of claim 9, wherein the plurality of diffractive waveguide emitters comprise gratings based emitters.

11. The eye tracking system of claim 9, wherein the plurality of diffractive waveguide emitters are to project at least one of binary and grayscale images onto the surface of the eye as the pattern.

12. The eye tracking system of claim 9, wherein the sensor system comprises a camera, a single-photon avalanche diode (SPAD) based sensor, a combination of an active MEMS shutter array, an optical lens, and a linear SPAD array.

13. The eye tracking system of claim 9, further comprising an optical lens to form a collimated output beam from light emitted by the selected diffractive waveguide emitters.

14. The eye tracking system of claim 9, wherein the plurality of MEMS adiabatic switches comprise electrostatically controlled couplers.

15. The eye tracking system of claim 9, wherein the controller is further to employ a compressive sensing technique to process the captured reflection of the pattern.

16. The eye tracking system of claim 9, wherein the light source comprises a side-emitting laser diode, a vertical-cavity surface-emitting laser (VCSEL) diode, a superluminescent light-emitting diode (SLED), or a light-emitting diode (LED).

17. The eye tracking system of claim 9, wherein the light source emits at least one of visible light, infrared light, or near-infrared (NIR) light.

18. A method, comprising:
providing, by a light source, collimated light;
projecting, using an ultrafast micro-electromechanical system (MEMS) reflector, a fringe pattern onto a surface of an eye by directing the collimated light to the surface of an eye;
capturing, using a single-photon avalanche diode (SPAD) based sensor system, a reflection of the projected fringe pattern from the surface of the eye;
retrieving three-dimensional (3D) features of the surface of the eye, by a controller, from the captured reflection of the projected fringe pattern employing at least one compressive sensing technique; and
determining, by the controller, a gaze of a user based on the retrieved 3D features of the surface of the eye.

19. The method of claim 18, wherein capturing the reflection of the projected fringe pattern comprises:
capturing the reflection of the projected fringe pattern through at least one SPAD sensor or a combination of an active MEMS shutter array, an optical lens, and a linear SPAD array.

20. The method of claim 18, wherein:
a surface the ultrafast MEMS reflector comprises a plurality of diffractive optical elements or a metasurface, and
the ultrafast MEMS is to operate at a frequency range from 10 kHz to 100 KHz.

* * * * *